(12) United States Patent
Nielsen et al.

(10) Patent No.: US 8,954,042 B2
(45) Date of Patent: Feb. 10, 2015

(54) SYSTEM, METHOD, AND APPARATUS FOR INCREASING A LIKELIHOOD OF ADVERTISEMENT DISPLAY

(75) Inventors: Per Nielsen, Chula Vista, CA (US); Amy Suzanne McGaraghan, Berkeley, CA (US); Susan McGarry, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 877 days.

(21) Appl. No.: 12/122,897

(22) Filed: May 19, 2008

(65) Prior Publication Data
US 2009/0286520 A1    Nov. 19, 2009

(51) Int. Cl.
*H04M 1/725* (2006.01)
*H04N 21/61* (2011.01)
*H04H 20/10* (2008.01)
(Continued)

(52) U.S. Cl.
CPC ........... *H04N 21/6131* (2013.01); *H04H 20/10* (2013.01); *H04H 60/85* (2013.01); *H04N 21/4126* (2013.01); *H04N 21/41407* (2013.01);
(Continued)

(58) Field of Classification Search
CPC ... H04W 4/02; H04W 4/12; H04W 29/08756; H04N 21/47214; H04N 21/4347; H04N 21/4348; H04N 21/482
USPC ........ 455/412.1–414.3; 725/35–42; 705/14.1, 705/14.4–14.5
See application file for complete search history.

(56) References Cited

U.S. PATENT DOCUMENTS

| 5,664,948 | A | 9/1997 | Dimitriadis et al. |
| 6,665,533 | B1 * | 12/2003 | Sakoda ...................... 455/414.2 |

(Continued)

FOREIGN PATENT DOCUMENTS

| CN | 1499888 A | 5/2004 |
| CN | 1925685 A | 3/2007 |

(Continued)

OTHER PUBLICATIONS

International Search Report, PCT/US2009/043572, International Searching Authority, European Patent Office, Sep. 15, 2009.
(Continued)

*Primary Examiner* — Dai A Phuong
(74) *Attorney, Agent, or Firm* — The Marbury Law Group, PLLC (57) ABSTRACT

Aspects include methods, systems, and apparatuses for increasing a likelihood of advertisement display. The method may include receiving advertisement information comprising a presentation schedule and indicia indicating the first advertisement; determining, based upon the advertisement information, whether the first advertisement is located on a mobile device; retrieving the first advertisement from a remote device and storing it on a storage module on the mobile device if the first advertisement is determined to not be located on the mobile device; and rendering the first advertisement on the mobile device. The method may also include receiving advertisement information comprising a retrieval schedule and retrieving the first advertisement from a remote device by reference to the retrieval schedule. Other methods and apparatuses include determining and broadcasting advertisement information.

21 Claims, 5 Drawing Sheets

(51) Int. Cl.
  *H04H 60/85* (2008.01)
  *H04N 21/41* (2011.01)
  *H04N 21/414* (2011.01)
  *H04N 21/432* (2011.01)
  *H04N 21/433* (2011.01)
  *H04N 21/81* (2011.01)

(52) U.S. Cl.
  CPC ......... *H04N 21/432* (2013.01); *H04N 21/4331* (2013.01); *H04N 21/812* (2013.01)
  USPC ................. 455/414.2; 455/412.1; 455/414.1; 455/414.3; 455/456.3; 455/466

(56) References Cited

U.S. PATENT DOCUMENTS

| | | | |
|---|---|---|---|
| 7,657,916 B2* | 2/2010 | Rodriguez et al. | 725/115 |
| 7,904,936 B2* | 3/2011 | Urdang | 725/145 |
| 2003/0084461 A1* | 5/2003 | Hoang | 725/145 |
| 2004/0048604 A1 | 3/2004 | Idei | |
| 2007/0049343 A1 | 3/2007 | Fukasawa | |
| 2007/0294722 A1* | 12/2007 | Kang et al. | 725/34 |
| 2009/0031357 A1* | 1/2009 | Ko | 725/50 |
| 2009/0048914 A1* | 2/2009 | Shenfield et al. | 705/14 |
| 2009/0093244 A1 | 4/2009 | Kataoka et al. | |
| 2009/0222867 A1 | 9/2009 | Munetsugu | |
| 2012/0272275 A1* | 10/2012 | Kunii et al. | 725/58 |

FOREIGN PATENT DOCUMENTS

| | | |
|---|---|---|
| CN | 101120588 A | 2/2008 |
| EP | 1263224 | 12/2002 |
| EP | 1760984 A2 | 3/2007 |
| JP | H1079711 A | 3/1998 |
| JP | H11500874 A | 1/1999 |
| JP | 2001292383 A | 10/2001 |
| JP | 2002245357 A | 8/2002 |
| JP | 2003141017 A | 5/2003 |
| JP | 2004166186 A | 6/2004 |
| JP | 2007066159 A | 3/2007 |
| JP | 2007096720 A | 4/2007 |
| JP | 2007536678 A | 12/2007 |
| KR | 100727063 B1 | 6/2007 |
| WO | 2005101411 A2 | 10/2005 |
| WO | 2006091044 A1 | 8/2006 |
| WO | 2007072670 A1 | 6/2007 |
| WO | 07082190 | 7/2007 |
| WO | 2007148407 A1 | 12/2007 |
| WO | 2008025578 | 3/2008 |

OTHER PUBLICATIONS

Written Opinion, PCT/US2009/043572, International Searching Authority, European Patent Office, Sep. 15, 2009.

European Search Report—EP14168675—Search Authority—Munich—Sep. 22, 2014.

* cited by examiner

SYSTEM, METHOD, AND APPARATUS FOR INCREASING A LIKELIHOOD OF ADVERTISEMENT DISPLAY

TECHNICAL FIELD

This application relates generally to communications, and more specifically, to communication of advertisements for display on a mobile device.

BACKGROUND

Electronic devices such as mobile telephone handsets and other mobile devices may be configured to receive broadcasts of multimedia content items that include sports, entertainment, informational programs, or advertisements. For example, audio and/or video data that may be displayed as an advertisement by the electronic device may be communicated using a broadband broadcast communications link to the electronic devices. Thus, a need exists for methods and apparatuses for providing, displaying, and increasing the likelihood of display of broadcast content items, specifically advertisements, on such electronic devices.

SUMMARY

Methods and apparatuses of the disclosure each have several embodiments, no single one of which is solely responsible for its desirable attributes. Without limiting the scope of this invention, for example, as expressed by the claims which follow, its more prominent features will now be discussed briefly. After considering this discussion, and particularly after reading the section entitled "Detailed Description" one will understand how the features of this invention provide advantages that include increasing a likelihood of advertisement display on a mobile device by using advertisement information that may comprise a retrieval schedule or a presentation schedule.

One embodiment includes a method for a mobile device for increasing a likelihood of presenting a first advertisement on a display of the mobile device. The method may include receiving into a storage module of the mobile device over a first broadcast communication link advertisement information, the advertisement information comprising a retrieval schedule and at least one indicia indicating a first advertisement multimedia item; determining, based upon the advertisement information, that the first advertisement multimedia item is not located in the storage module of the mobile device; and modifying an operation mode of the mobile device to retrieve the first advertisement multimedia item from a remote device. The method may also include modifying the operation mode of the mobile device by reference to the retrieval schedule.

Another embodiment includes a method of increasing a likelihood of presenting a first advertisement on a mobile device display. The method may include receiving advertisement information comprising a presentation schedule and indicia indicating the first advertisement; determining, based upon the advertisement information, that the first advertisement is not located on the mobile device; retrieving the first advertisement from a remote device and storing the first advertisement on a storage module on the mobile device; and rendering the first advertisement on the mobile device. The method may also include storing the presentation schedule on the mobile device and updating the presentation schedule after rendering the advertisement on the mobile device.

Another embodiment includes a method of increasing a likelihood of presenting a first advertisement on a mobile device display. The method may include broadcasting the first advertisement; determining advertisement information comprising a retrieval schedule and indicia indicating the first advertisement; and broadcasting the advertisement information. The method may also include receiving a request for the first advertisement in accordance with the retrieval schedule and transmitting the first advertisement in accordance with the retrieval schedule.

Another embodiment includes a method of increasing a likelihood of presenting a first advertisement on a mobile device display. The method may include broadcasting the first advertisement; determining advertisement information comprising a presentation schedule and indicia indicating the first advertisement; and broadcasting the advertisement information. The method may also include determining when the first advertisement should be rendered on the mobile device and broadcasting an indicator when the first advertisement should be rendered.

Other embodiments include methods and apparatuses for broadcasting and receiving advertisement information in ways that increase a likelihood of presenting an advertisement on a mobile device display by reference to a retrieval and/or presentation schedule.

DETAILED DESCRIPTION

The following detailed description is directed to certain embodiments of the disclosure. However, the invention can be embodied in a multitude of different ways, for example, as defined and covered by the claims. It should be apparent that the embodiments herein may be embodied in a wide variety of forms and that any specific structure, function, or both being disclosed herein is merely representative. Based on the teachings herein one skilled in the art should appreciate that an embodiment disclosed herein may be implemented independently of any other embodiments and that two or more of these embodiments may be combined in various ways. For example, an apparatus may be implemented or a method may be practiced using any number of the embodiments set forth herein. In addition, such an apparatus may be implemented or such a method may be practiced using other structure, functionality, or structure and functionality in addition to or other than one or more of the embodiments set forth herein.

Electronic devices may be configured to receive and display content items broadcast by wireless broadcast systems. In some instances, the broadcast content items may comprise multimedia content items, such as sports programs, entertainment programs, informational programs, or advertisements, among other types of content items. With respect to the advertisements, they may be displayed individually by the electronic devices, or may be integrated into other broadcast content items. For example, an advertisement may be displayed during a break from a sports program or before an entertainment program begins. In this way, advertisements can be displayed in conjunction with other broadcast content items.

When displaying an advertisement in conjunction with other broadcast content items, the electronic device may receive the advertisement at a time nearly equivalent to when the advertisement is to be displayed, or the electronic device may receive the advertisement beforehand and store the advertisement until an appropriate time to display the advertisement. Both receiving the advertisement at a time nearly equivalent to when the advertisement is to be displayed and receiving the advertisement beforehand have their advantages and disadvantages.

Receiving the advertisement at or just prior to when the advertisement is to be displayed has the advantage that the advertisement will likely be available for display by the electronic device. The advertisement may be broadcast in sequence with the other content items and the electronic device may receive the advertisement and display it almost immediately thereafter. As long as the electronic device is receiving the other content items over the broadcast link, it will likely receive and display the advertisement. Broadcasting advertisements in this way, however, places a burden on the broadcast system. The system must determine the correct advertisement to broadcast and then repeatedly broadcast the advertisement every time the advertisement is to be displayed.

Receiving and storing the advertisement well in advance of display has the advantage of reducing load on the system, as well as providing an advertisement specific to the electronic device or to a user of the electronic device. Appropriate advertisements may be determined and broadcast at a time when the system is not busy and the advertisements may be stored on the mobile device for later display. Thus, the broadcast system does not need to determine the correct advertisement and repeat broadcast of the advertisement every time an advertisement is warranted. Such prior broadcast and storage of advertisements, however, raises an issue with respect to ensuring that the advertisement has been properly received beforehand so that it is available when it is supposed to be displayed. For example, the electronic device may have been shut off or out of a service area of the broadcast system when the advertisement was broadcast, or the advertisement may have become corrupted or been deleted since reception.

Unavailability of advertisements poses several problems. One such problem is a loss of revenue for the broadcast system. The lost revenue may be from pay advertisers or lost opportunity for the broadcaster to advertise additional services it offers. This is because if the advertisements are unavailable for display, advertisers will not want to invest money in the broadcast advertisements and the broadcast system will not be able to advertise any of its own additional services. Another issue relates to the gap or an interruption in the broadcast content items caused by a missing advertisement. For example, a user of the electronic device may be forced to sit through silence before a program resumes or the broadcast may be interrupted. Thus, a need exists for increasing a likelihood of advertisement display.

In one embodiment, a mobile device receives advertisement information that comprises a presentation schedule and an indicia indicating a first advertisement; determines, based upon the advertisement information, whether the first advertisement is located on the mobile device; retrieves the first advertisement from a remote device if the advertisement is determined to not be located on the mobile device; and renders the first advertisement. In another embodiment, the advertisement information further comprises a retrieval schedule and the mobile device retrieves the first advertisement from a remote device by reference to the retrieval schedule.

Figure 1:
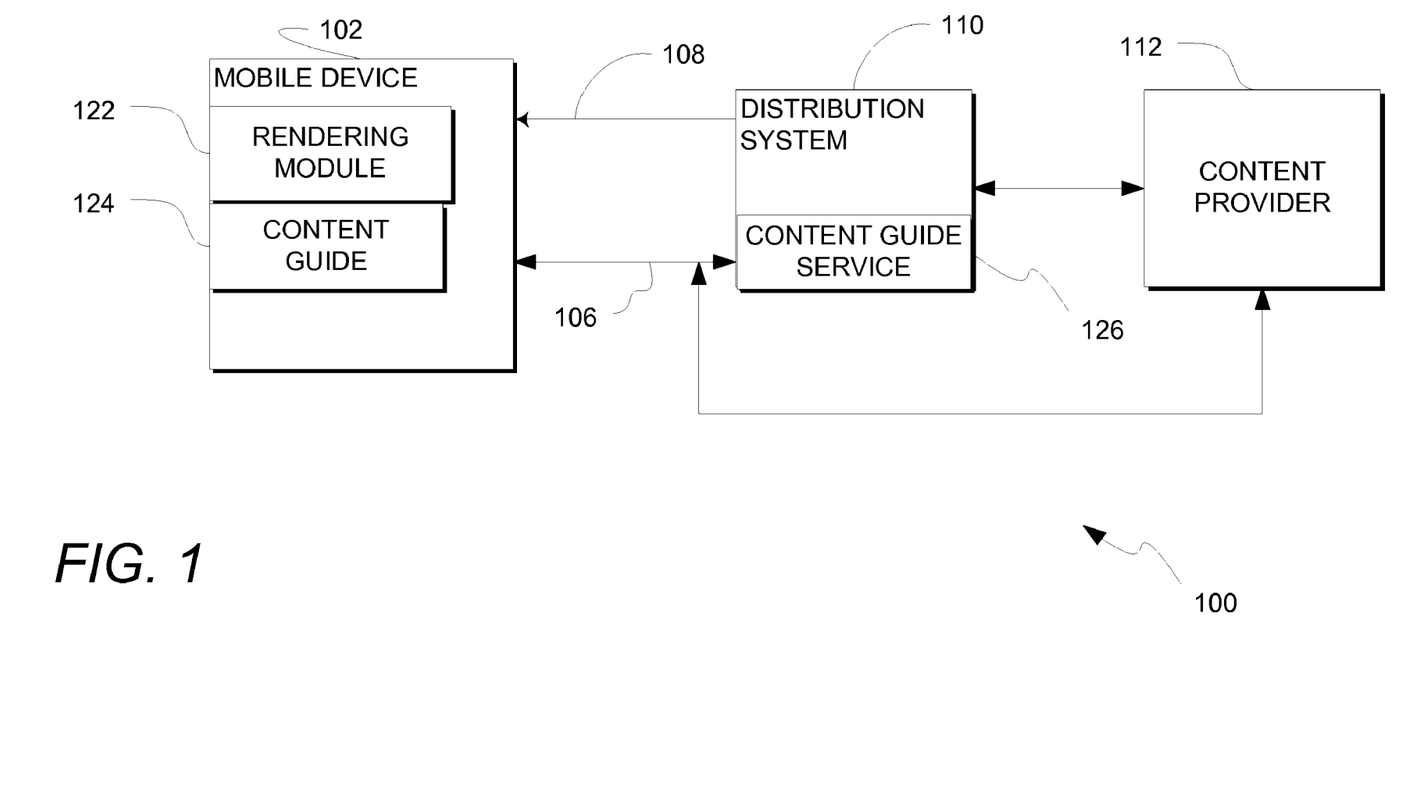
FIG. 1 is a block diagram illustrating an exemplary system for providing broadcast content items to mobile devices.

FIG. 1 is a block diagram illustrating an example system 100 for providing broadcast content items to mobile devices 102 from one or more content providers 112 via a distribution system 110. While a single mobile device 102 is shown in FIG. 1, examples of the system 100 may be configured to use any number of mobile devices 102. The distribution system 110 may receive data representing a multimedia content item from the content provider 112. The multimedia content items may be communicated over a wired or wireless content communication link 108. In one embodiment, the communications link 108 is a high speed or broadband link. In one embodiment, the content provider 112 may communicate the content directly to the mobile device 102, bypassing the distribution system 110, via the same or a different communications link. It is to be recognized that in other embodiments multiple content providers 112 may provide content items via multiple distribution systems 110 to the mobile devices 102.

In the example system 100 of FIG. 1, the content communication link 108 is illustrated as a unidirectional network. However, the content communication link 108 may also be a fully symmetric bi-directional network. The content communication link 108 may comprise one or more wired and/or wireless links, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1×EV-DO or 1×EV-DO Gold Multicast) system, an IEEE 802.11 system, a MediaFLO system, a DMB system, an orthogonal frequency division multiple access (OFDM) system, or a DVB-H system.

In the example system 100, the mobile device 102 is also configured to communicate on a second communication link 106. In one embodiment, the second communication link 106 is a two way communication link in the example system 100, however, the link 106 may also comprise a second link from the mobile device 102 to the distribution system 110 and/or the content provider 112. The second communication link 106 may also be a wireless network configured to communicate voice traffic and/or data traffic. The second communication link 106 may communicate content guide and other data between the distribution system 110 and the mobile device 102.

The mobile device 102 includes a rendering module 122 configured to render the multimedia content items received over the content communication link 108. The rendering module 122 may include analog and/or digital technologies. The rendering module 122 may include one or more multimedia signal processing systems, such as video encoders/decoders, using encoding/decoding methods based on international standards such as MPEG-x and H.26x standards.

Such encoding/decoding methods generally are directed towards compressing the multimedia data for transmission and/or storage.

In addition to communicating content items to the mobile device 102, the distribution system 110 may also include a content guide service 126. The content guide service 126 receives content schedule and content related data from the content provider 112 and/or other sources and communicates data representing defining an electronic content guide 124 to the mobile device 102. The electronic content guide 124 may include data related to the broadcast schedule of multiple content items available to be received over the content communication link 108. The electronic content guide data may include titles of programs, start and end times, category classification of programs (e.g., sports, movies, comedy, etc.), quality ratings, adult content ratings, etc. The EPG 124 may also be communicated to the mobile device 102 over the content communication link 108 and stored in the mobile device 102.

Figure 2:
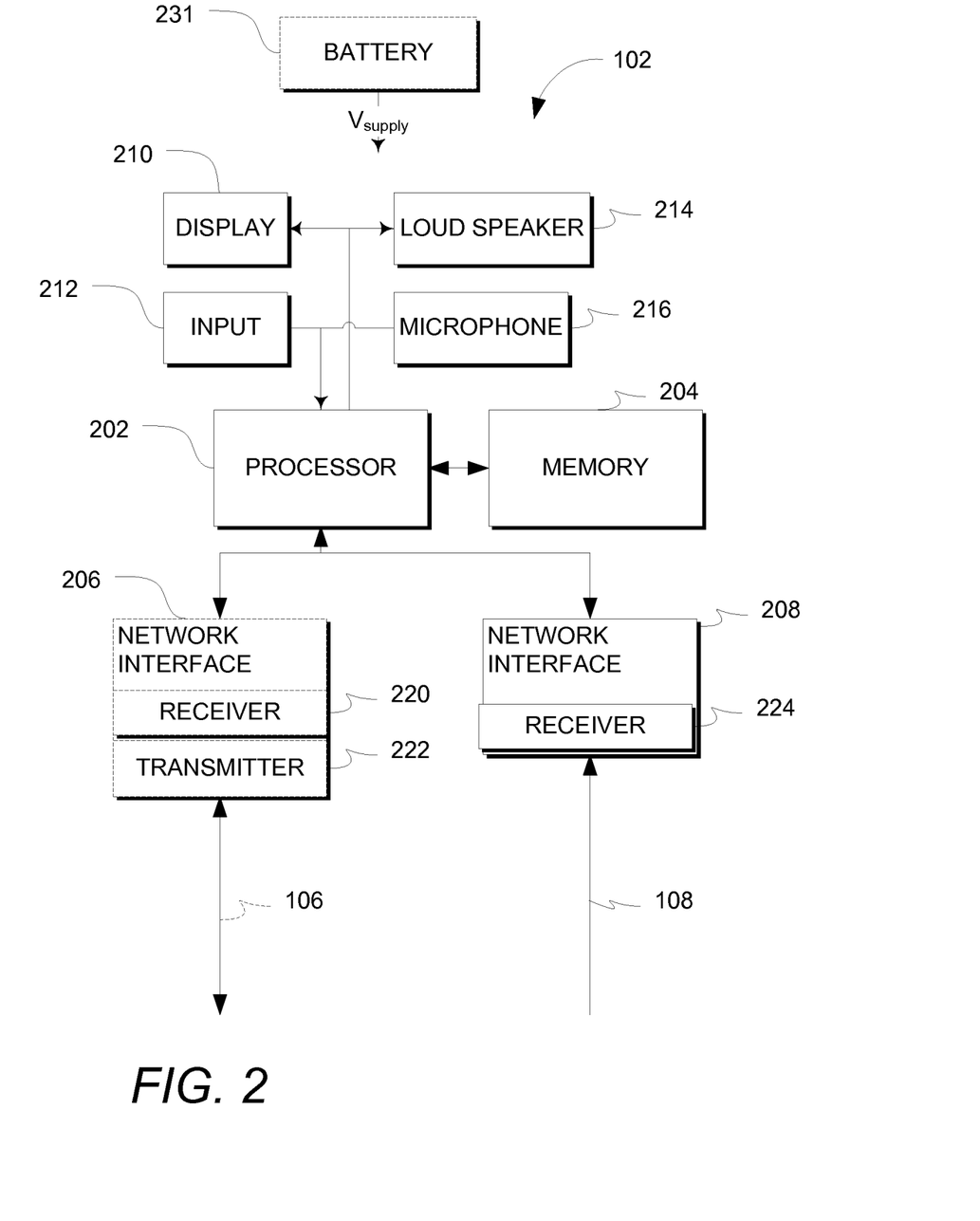
FIG. 2 is a block diagram illustrating an example of a mobile device such as illustrated in FIG. 1.

FIG. 2 is a block diagram illustrating an example of the mobile device 102 such as illustrated in FIG. 1. The device 102 includes a processor 202 that is in communication with a memory 204 and a network interface 208 that communicates over the content communication link 108. The network interface 208 includes a receiver 224 configured to receive the unidirectional content communication link 108. The network interface 208 and receiver 224 may receive signals according to wired and/or wireless technologies and/or links, such as those described with reference to content communication link 108.

The mobile device 102 may include an optional second network interface 206 for communicating via the second bi-directional communication link 106. The network interface 206 may include any suitable antenna (not shown), a receiver 220, and a transmitter 222 so that the exemplary device 102 can communicate with one or more devices over the second communication link 106. Optionally, the network interface 206 may also have processing capabilities to reduce processing requirements of the processor 202.

The device 102 also includes one or more of a display 210, a user input device 212 such as a key, touch screen, or other suitable tactile input device, a loudspeaker 214 comprising a transducer adapted to provide audible output based on a signal received over the second communication link 106 and/or a microphone 216 comprising a transducer adapted to provide audible input of a signal that may be transmitted over one or both of the second communication link 106 and content communication link 108.

The device 102 may optionally include a battery 231 to provide power to one or more components of the device 102. The device 102 may comprise at least one of a mobile handset, a personal digital assistant, a laptop computer, a headset, a vehicle hands free device, or any other electronic device. For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, or any other suitable device.

The components described herein may be implemented in a variety of ways. Referring to FIG. 2, the device or apparatus 102 is represented as a series of interrelated functional blocks that may represent functions implemented by, for example the processor 202, software, some combination thereof, or in some other manner as taught herein. For example, the processor 202 may facilitate user input via the input devices 212. Further, the transmitter 222 may comprise a processor for transmitting that provides various functionalities relating to transmitting information to another device 102. The receiver 220 may comprise a processor for receiving that provides various functionalities relating to receiving information from another device 102.

The device 102 may be configured to receive data concurrently from one or both of the second communication link 106 and content communication link 108. For example, the processor 202 may be incapable of performing the receiving and/or transmitting functions of the bidirectional network interface 206 at the same time that the broadband unidirectional interface 208 is receiving over the content communication link 108. Thus, for example, in one embodiment, reception or display of a broadcast of a program may be discontinued over the content communication link 108 when a signal, e.g., a telephone call for example, is received over the second communication link 106.

As noted above, FIG. 2 illustrates that in some aspects these components may be implemented via appropriate processor components. These processor components may in some aspects be implemented, at least in part, using structure as taught herein. In some aspects, a processor may be adapted to implement a portion or all of the functionality of one or more of these components. In some aspects one or more of the components represented by dashed boxes are optional.

In some aspects, the device or apparatus 102 may comprise an integrated circuit. Thus, the integrated circuit may comprise one or more processors that provide the functionality of the processor components illustrated in FIG. 2. For example, in some aspects a single processor may implement the functionality of the illustrated processor components, while in other aspects more than one processor may implement the functionality of the illustrated processor components. In addition, in some aspects the integrated circuit may comprise other types of components that implement some or all of the functionality of the illustrated processor components.

Figure 3:
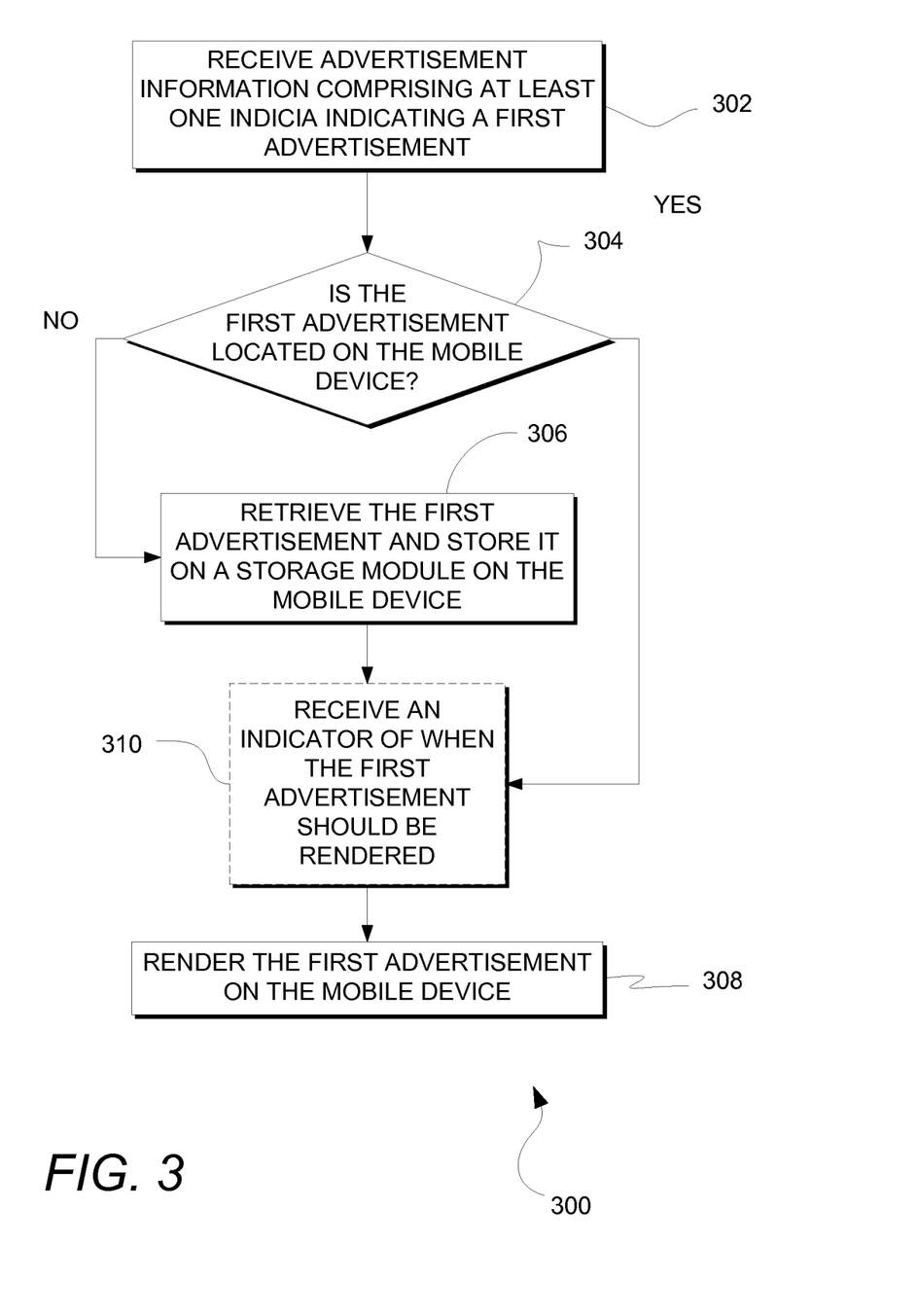
FIG. 3 is a flowchart illustrating an example of a method of using advertisement information to increase a likelihood of advertisement display on a mobile device, such as illustrated in FIG. 2.

FIG. 3 is a flowchart illustrating an example of a method 300 of using advertisement information to increase a likelihood of advertisement display on mobile device 102, such as illustrated in FIG. 2. The acts or events associated with method 300 may be performed by different configurations of mobile device 102 than those herein described. Those skilled in the art will know how to extend the method described to different configurations of mobile device 102 and will understand that different components within mobile device 102 may perform the method than are herein described.

The advertisement information increases a likelihood of advertisement display by enabling mobile device 102 to retrieve an advertisement in advance of when the advertisement is to be displayed. Such retrieval may be according to a variety of preferences or priorities, or using one of a plurality of connections, as described below. In addition, the retrieved advertisement may be targeted to mobile device 102 or to a user of mobile device 102. In this way, mobile device 102 can timely retrieve a specific or targeted advertisement.

At block 302 of method 300, mobile device 102 receives advertisement information, such as by using receiver 224 or receiver 220. The advertisement information is received over a communications link in broadcast system 100, such as over content communication link 108 or second communication link 106. After receiving the advertisement information, mobile device 102 may store the advertisement information in memory 204. The advertisement information comprises at least one indicia indicating a first advertisement.

The indicia indicating the first advertisement may be a name of the advertisement, an identification number of the advertisement, a product featured in the advertisement, a company sponsoring the advertisement, or any other information that would identify the advertisement. The indicia may also indicate a group of advertisements, such as any advertisements that relate to sporting equipment, or any advertisements that are forty seconds in length, so long as the first advertisement is indicated by the indicia. The indicia may also be a combination of such information.

The advertisement information may additionally comprise metadata. The metadata may contain information relating to a priority of the first advertisement, a priority of one or more attributes of the advertisement, or a demographic applicability of the advertisement, among other information. For example, the metadata may identify the advertisement as a high, medium, or low priority. The metadata may also identify that the advertisement is the third most preferred advertisement. Additionally, the metadata may identify that the length of the advertisement or subject matter of the advertisement has a certain priority in relation to other advertisements or advertisement attributes, for example. To add to this, the metadata may identify an age group for which the advertisement is appropriate, a geographic location for which the advertisement is targeted, or a relevant affiliation or membership of a user of mobile device 102. The metadata may also comprise a combination of such information.

The first advertisement is preferably intended for display on mobile device 102. Accordingly, the advertisement indicated by the indicia and/or metadata is generally already located on mobile device 102. The advertisement may have been stored on mobile device 102 in any number of ways. For example, one or more advertisements may be stored in memory 204 at the time of manufacturing the mobile device 102 or before distributing the mobile device 102 to a user. The mobile device 102 may also have received the advertisement beforehand via broadcast, such as over content communication link 108 using receiver 224. The advertisement may be stored on mobile device 102 in any other number of ways, such as by mobile device 102 receiving the advertisement beforehand by requesting the advertisement from a server device or by receiving the advertisement over a unicast network connection with another device, for example over second communication link 106 using receiver 220.

Those skilled in the art will appreciate that the indicia and/or metadata may identify advertisements that are targeted to a specific mobile device 102 or user of mobile device 102. Displaying such advertisements on mobile device 102 instead of displaying the default broadcast advertisements ensures that a user of mobile device 102 will experience a customized and relevant advertisement.

The advertisement information may also comprise an advertisement expiration value. The advertisement expiration value may identify when the first advertisement expires or when the advertisement should no longer be displayed. For example, the advertisement expiration value may indicate a number of times to display the advertisement, a date, remaining life, or an accumulated display time. After the advertisement expiration value has lapsed, expired, or been satisfied, mobile device 102 will no longer display the advertisement.

The advertisement information may also comprise a presentation schedule. The presentation schedule may be a schedule that identifies the time or order in which broadcast content is to be displayed on mobile device 102, such as on display 210, or received by mobile device 102, such as over content communication link 108 using receiver 224 or over second communication link 106 using receiver 222. For example, the presentation schedule may identify a particular sports program that is to be displayed and/or received over a predetermined thirty minutes. In one embodiment, the presentation schedule may identify a program and a number of advertisements to display during that program. In another embodiment, the presentation schedule may identify a program and specific times or locations during that program that an advertisement is to be displayed. In yet another embodiment, the presentation schedule may identify an order in which to play advertisements.

At block 304, it is determined whether the first advertisement is located on mobile device 102. Such determination may be made by processor 202, for example, by determining whether the advertisement is stored in memory 204. If the advertisement is located on mobile device 102, then mobile device 102 progresses to block 308, although mobile device 102 may progress to optional block 310 before progressing to block 308. If the advertisement is not located on mobile device 102, mobile device 102 progresses first to block 306 before progressing to block 308 or optional block 310.

With respect to block 304, in the case where the indicia identifies a specific advertisement, such as when the indicia is a name or identification number of the advertisement, then processor 202 merely has to compare the received indicia with a name or identification number of any advertisements stored in memory 204, as is known in the art. If the indicia identifies a featured product, sponsoring company, or some other type of content, this information may also be stored with the file, such as in an accompanying header file stored in memory 204. Information such as the theme or length of an advertisement may also be associated with stored advertisements, for example by storing such information in the accompanying header file. In these cases, processor 202 can compare the indicia to the accompanying header file, or to other sources of stored attribute information, to determine whether the first advertisement is located on mobile device 102.

Still with respect to block 304, if the advertisement information contains metadata, then additional actions may be required to determine if the first advertisement is located on mobile device 102. For example, when the advertisement information contains metadata identifying the priority of an advertisement, or a priority or priorities of an attribute or attributes of the advertisement, then mobile device 102 may need to compare advertisements or attributes of advertisements located on mobile device 102. Such comparison may be executed with processor 202 by referencing information stored in memory 204, for example.

When a priority of the first advertisement is provided, the advertisement may be identified in a number of ways. For example, if the metadata contains a medium priority, the first advertisement may be identified as any advertisement with a medium priority, or any advertisement with at least a medium priority. If the metadata contains a specifically numbered priority, the first advertisement may be identified as that numbered advertisement when the stored advertisements are organized by priority. In one embodiment, mobile device 102 will first attempt to identify a stored advertisement as the first advertisement by searching for an advertisement that satisfies the metadata priority, but will identify a stored advertisement that doesn't exactly satisfy the metadata priority if no other stored advertisements satisfy the metadata priority.

When priorities of one or more attributes of the first advertisement are provided, the advertisement may be identified in a number of ways. In one embodiment, the stored advertisement satisfying the highest number of attribute priorities is identified as the first advertisement, even if the advertisement doesn't satisfy all of the metadata attribute priorities. In another embodiment, a stored advertisement cannot be identified as the first advertisement unless it satisfies all of the metadata attribute priorities. In this embodiment, a stored advertisement that satisfies all of the metadata attribute priorities can be identified as the first advertisement or it may only be identified as the first advertisement if it has the highest attribute priorities of all stored advertisements satisfying the metadata attribute priorities. In yet another embodiment, a combination of a priority for the entire set of advertisement attributes is used.

When the advertisement information identifies a demographic applicability of the first advertisement, then a user profile of a user of mobile device 102 may be accessed to determine whether the advertisement is located on mobile device 102. Attributes of any advertisement stored on mobile device 102, such as in memory 204, may be compared to the demographic applicability and/or user profile to determine if any of the stored advertisements are the first advertisement. For example, the advertisement information may specify a predetermined age range for which the advertisement should be displayed or may specify that the advertisement is targeted towards an age group of the user of mobile device 102.

A user profile of a user of mobile device 102 may contain information such as the age, the geographic location, or an affiliation or membership of the user. Some of this information may be stored on mobile device 102, such as in memory 204, during manufacture or distribution. For example, a geographic location may be stored in mobile device 102 if the device is initially only available for sale in certain areas, or an age range may be stored if mobile device 102 is designed for children of a certain age. Alternatively, the user of mobile device 102 may enter user profile information manually, such as by using input 212. The user may also provide user profile information to a retailer or service provider, such as at the point of sale or using the Internet. Such provided information may be stored on a remote device and accessed by mobile device 102 over second communication link 106 using transmitter 222 and receiver 220, for example, or the provided information may be transmitted to mobile device 102 for storage on mobile device 102, such as over second communication link 106 for storage in memory 204. Mobile device 102 may also be able to determine user profile data such as geographic location by using methods that involve GPS, triangulation, or other methods, as are known in the art.

The presence of indicia and/or metadata does not necessitate that either or both will be used. It is contemplated that there are situations in which neither, both, or one to the exclusion of the other will be used. For example, there may be situations in which a single advertisement stored in memory 204 will be used without considering either the indicia or metadata. In one embodiment, the indicia will be used to determine whether the first advertisement is located on mobile device 102, regardless of whether there is any metadata in the advertisement information. Alternatively, the metadata may be used regardless of whether there is any indicia or only when there is no indicia. In another embodiment, metadata will be used to resolve any ambiguities that result from using the indicia to determine if the advertisement is located on mobile device 102. In yet another embodiment, the indicia will be used only when there is no metadata in the advertisement information or only to resolve any ambiguities that result from using the metadata to determine if the advertisement is located on mobile device 102. In still yet another embodiment, both the indicia and metadata are always considered. All of the indicia and/or metadata may be used, or only a portion of the indicia and/or metadata may be used.

If the first advertisement is not located on mobile device 102, then at block 306 the advertisement is retrieved and stored on a storage module of mobile device 102. A request for the advertisement may be sent to a remote device using transmitter 222, such as over second communication link 106. In response, the advertisement may be received from that remote device or another remote device using receiver 224 or receiver 220, such as over content communication link 108 or second communication link 106. The retrieved advertisement is stored on a storage module of mobile device 102, such as in memory 204, in a module within memory 204, or any other storage module of mobile device 102 (not shown).

Mobile device 102 may retrieve the advertisement using a number of methods. In one embodiment, mobile device 102 may connect to one of a plurality of remote devices using one of a plurality of connections. To increase the likelihood of mobile device 102 being able to retrieve the first advertisement at a specific time, the plurality of remote devices may contain similar content and the plurality of connections may be similar. This redundancy increases the likelihood that the advertisement will be available for retrieval. Alternatively, the plurality of remote devices may contain different content or the plurality of connections may be different. For example, content or data of a specific type may be stored on a certain remote device or may be best retrieved using a specific type of connection.

Designations, preferences, or priorities of remote devices from which to retrieve advertisements or connections to use may be stored in mobile device 102 or may be contained in the advertisement information. A window of time that each remote device or connection is available may also be stored on mobile device 102 or contained in the advertisement information. Additionally, designations, preferences, or priorities of such time windows may be stored or received.

In one embodiment, mobile device 102 may use a direct connection with a remote device storing the advertisement. By using a direct connection, mobile device 102 may timely retrieve a specific advertisement. Mobile device 102 may retrieve the advertisement when necessary, as opposed to waiting for the broadcast of the particular advertisement. In addition, mobile device 102 may retrieve a specific advertisement or advertisements having specific attributes rather than wait for a transmission of all advertisements. In this way, mobile device 102 may receive an advertisement at a time prior to broadcast or may receive advertisements targeted to mobile device 102 or a user of mobile device 102.

At block 308, the first advertisement is rendered on mobile device 102, such as using rendering module 122 to render the advertisement for display on display 210. Rendering module 122 may be implemented as internal to processor 202, as part of display 210, or using separate circuitry, software, or modules than are herein described that are configured to render advertisements for display on mobile device 102.

The advertisement may be rendered according to the presentation schedule. For example, when the presentation schedule identifies a number of advertisements to display during a broadcast program, mobile device 102 may render the first advertisement as at least one of the number of advertisements during that program. When the presentation schedule identifies specific times or locations during a broadcast program that an advertisement is to be displayed, mobile device 102 may render the advertisement during at least one of those specific times or locations. When the presentation schedule identifies an order in which to play advertisements, mobile device 102 may render the advertisement according to that order.

Optionally, at block 310, mobile device 102 may receive an indicator of when the first advertisement should be rendered before rendering the advertisement at block 308. For example, when the presentation schedule identifies a number of advertisements to display during a broadcast program, mobile device 102 may determine that number of advertisements, which number includes the first advertisement, is stored on mobile device 102. However, mobile device 102 may not render any of the number of advertisements until after receiving the indicator in block 308. The indicator may indicate that an advertisement should be played immediately, or it may indicate that an advertisement should be displayed at a time or location in the future.

After rendering the first advertisement at block 308, the presentation scheduled may be updated. In one embodiment, mobile device 102 may store the presentation schedule in memory 204 after receiving it. Then, mobile device 102 may update the presentation schedule in memory 204, such as by updating the number or order of advertisements yet to be displayed during a broadcast program or by storing a confirmation of advertisement display at a certain time or location. In another embodiment, the presentation schedule may be stored on a remote device and mobile device 102 may update it by transmitting information to the remote device, such as over second communication link 106 using transmitter 222. In this embodiment, a remote device can be assured that mobile device 102 displayed the correct advertisements, number of advertisements, or order of advertisements.

Figure 4:
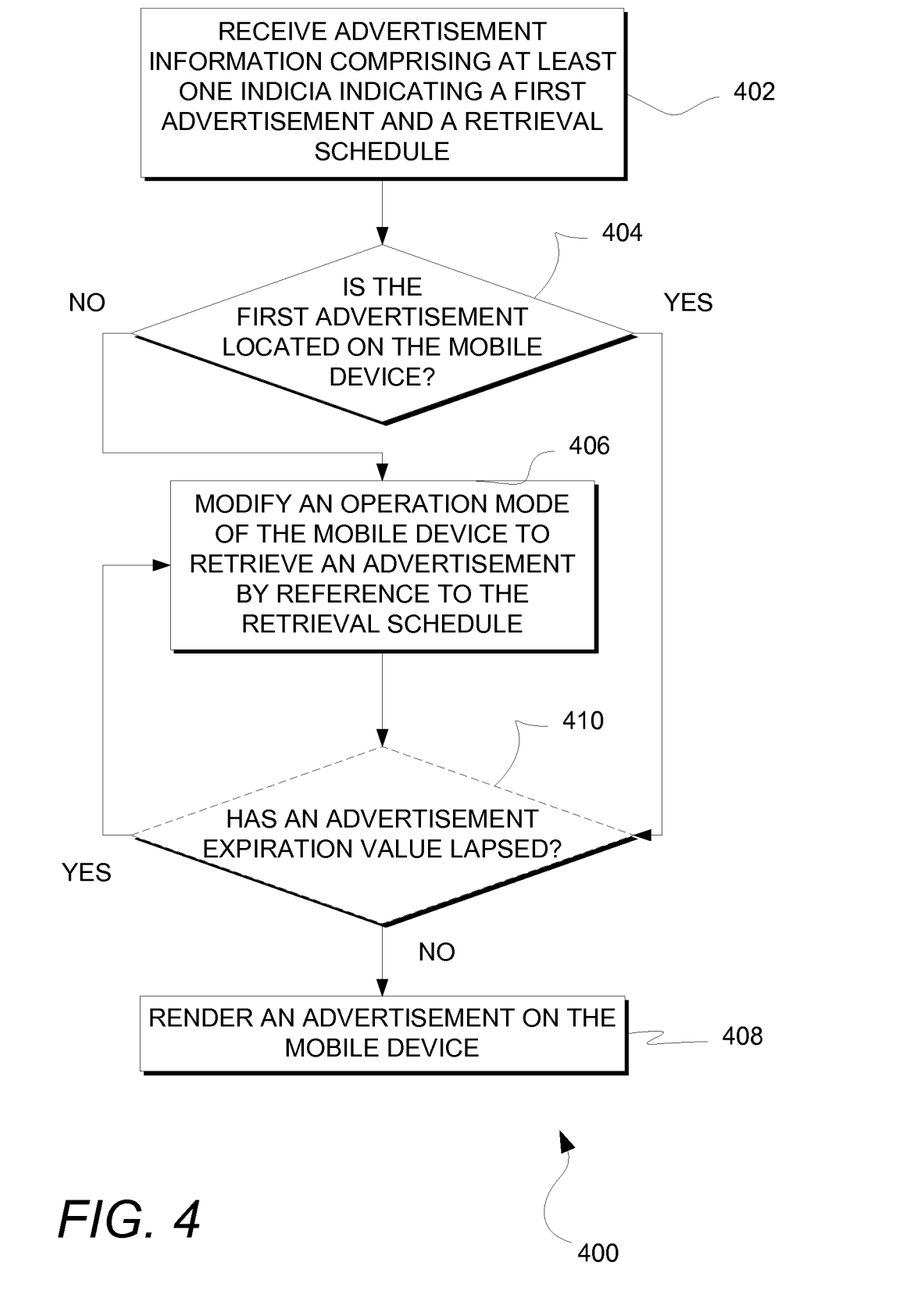
FIG. 4 is a flowchart illustrating another example of a method of using advertisement information to increase a likelihood of advertisement display on a mobile device, such as illustrated in FIG. 2.

FIG. 4 is a flowchart illustrating another example of a method 400 of using advertisement information to increase a likelihood of advertisement display on mobile device 102, such as illustrated in FIG. 2. The acts or events associated with method 400 may be performed by different configurations of mobile device 102 than those herein described. Those skilled in the art will know how to extend the method described to different configurations of mobile device 102 and will understand that different components within mobile device 102 may perform the method than are herein described.

At block 402 of method 400, mobile device 102 receives advertisement information, such as using receiver 224 or receiver 220. The advertisement information is received over a communications link in broadcast system 100, such as over content communication link 108 or second communication link 106. After receiving the advertisement information, mobile device 102 may store the advertisement information in memory 204. The advertisement information comprises at least one indicia indicating a first advertisement and a retrieval schedule.

The indicia indicating the first advertisement may be any of the indicia described with reference to the indicia indicating the first advertisement at block 302 of method 300. The advertisement information may additionally comprise metadata and an advertisement expiration value, also as described with reference to block 302 of method 300.

The retrieval schedule may identify a number of different events or devices. For example, the retrieval schedule may identify when a remote device that stores, receives requests for, and/or transmits advertisements may be available. The retrieval schedule may also refer to or have been determined with reference to a presentation schedule. In this case, the retrieval schedule may identify when mobile device 102 can or needs to retrieve the first advertisement in order for the advertisement to be displayed according to the presentation schedule. Additionally, the retrieval schedule may identify when mobile device 102 should be available.

The retrieval schedule may also identify preferences or priorities of a remote device from which to retrieve advertisements or a preferred connection over which to retrieve those advertisements, as well as which remote devices to access or connections to use for specific types of content or data. Such preferences or priorities may apply to all mobile devices, or may be determined by each mobile device 102 based on information in the retrieval schedule. For example, the retrieval schedule may contain a list of accessible remote devices or available connections based on a speed at which mobile device 102 can receive data.

At block 404, it is determined whether the first advertisement is located on mobile device 102. Such determination may be made by processor 202, for example, by determining whether the advertisement is stored in memory 204. If the advertisement is located on mobile device 102, then mobile device 102 progresses to block 408, although mobile device 102 may progress to optional block 410 before progressing to block 408. If the advertisement is not located on mobile device 102, mobile device 102 progresses first to block 406 before progressing to block 408 or optional block 410.

The determination made at block 404 may be according to any of the determinations described with reference to block 304 of method 300. Such determination may include the use of indicia and/or metadata, as described with reference to block 304.

If the first advertisement is not located on mobile device 102, then at block 406 an operation mode of mobile device 102 is modified to retrieve the first advertisement by reference to the retrieval schedule. For example, processor 202 may remove mobile device 102 from a mode in which mobile device 102 is receiving broadcast content, such as over content communication link 108 using receiver 224, and place mobile device 102 in a mode that allows for requesting the first advertisement, such as over second communication link 106 using transmitter 222. Processor 202 may do this according to when a remote device that stores, receives requests for, and/or transmits the first advertisement is available; when it is necessary to have the first advertisement for display on mobile device 102; or when mobile device 102 is available, as identified by the retrieval schedule received at block 302.

A request for the first advertisement may be sent to a remote device using transmitter 222, such as over second communication link 106. In one embodiment, this request may be transmitted over an Internet connection. In another embodiment, the request may be transmitted over a unicast network connection. In response, the advertisement may be received from that remote device or another remote device using receiver 224 or receiver 220, such as over content communication link 108 or second communication link 106. For example, the advertisement may be transmitted over an Internet connection, or transmitted over a unicast network connection. Mobile device 102 may monitor such transmitting and may store the advertisement, such as in memory 204 or in another storage module of mobile device 102, after receiving the advertisement.

An operation mode of mobile device 102 may be modified to retrieve the advertisement using an unicast connection with the remote device. By using an unicast, or a direct connection, mobile device 102 may timely retrieve a specific advertisement. Mobile device 102 may retrieve the advertisement when necessary, as opposed to waiting for broadcast of advertisements. In addition, mobile device 102 may retrieve a specific advertisement or advertisements having specific attributes. In this way, mobile device 102 may receive an advertisement at a time prior to broadcast or may receive specific advertisements which are targeted to mobile device 102 or a user of mobile device 102.

An operation mode of mobile device 102 may also be modified to retrieve the advertisement according to designations, priorities, or preferences of a remote device from which to retrieve content, a connection to be used, and/or a window of time at which to retrieve the advertisement. Such designation, priority, or preference information may be stored in mobile device 102 or contained in the advertisement data, such as in the retrieval schedule.

At block 408, the first advertisement is rendered on mobile device 102, such as using rendering module 122 to render the advertisement for display on display 210. Rendering module 122 may be implemented as internal to processor 202, as part of display 210, or using separate circuitry, software, or modules than are herein described that are configured to render advertisements for display on mobile device 102.

Optionally, at block 410, mobile device 102 may determine whether an advertisement expiration value has lapsed before rendering the first advertisement. The advertisement expiration value may have been contained in the advertisement information received at block 402. The determination may be made by processor 202 and/or a timing or calendar module (not shown), such as by reference to memory 204. For example, memory 204 may store how many times the first advertisement has been displayed, the date at which to stop displaying the advertisement, the date at which the advertisement was first displayed, or how much time mobile device 102 has spend displaying the advertisement.

If the advertisement expiration value has lapsed, then mobile device 102 returns to block 406 to retrieve an advertisement. The retrieved advertisement may or may not be the first advertisement. In one embodiment, the retrieved advertisement is the same as the first advertisement. In another embodiment, the retrieved advertisement is an updated version of the first advertisement. In yet another embodiment, the retrieved advertisement is sponsored by the same company as the first advertisement and is intended to replace the first advertisement. In still yet another embodiment, the retrieved advertisement isn't related to the first advertisement. Other embodiments of the retrieved advertisement will be recognized by those skilled in the art.

After retrieving an advertisement, mobile device 102 may again determine if an advertisement expiration value has lapsed, at block 410, or may render the retrieved advertisement, at block 408. Blocks 410 and 408 have already been described above.

The example methods described above in reference to FIGS. 3 and 4, or portions thereof, may be performed intermittently or at regular intervals by mobile device 102. For example, mobile device 102 may receive advertisement information and perform method 300 before broadcast content is to be displayed, or at times when new broadcast content becomes available. Mobile device 102 may also receive advertisement information and perform method 300 in periodic cycles, such as every eight hours, or at a predetermined time each day, for example at midnight.

In addition, determining whether a first advertisement is located on mobile device 102, as illustrated at blocks 304 and 404, may be performed multiple times for each time that advertisement information is received, as illustrated at blocks 302 and 402. For example, after receiving advertisement information including indicia indicating a first advertisement, mobile device 102 may repeatedly determine whether the first advertisement is located on mobile device 102 before receiving subsequent advertisement information. This determination may be at regular intervals, such as twice a day, or may continue until it is determined that the first advertisement is located on mobile device 102. Although the first advertisement may not have been located on mobile device 102 when the advertisement information was received, the first advertisement may have subsequently been stored on mobile device 102 as a result of subsequent broadcast of the first advertisement or as a result of mobile device 102 retrieving the first advertisement over an alternate communication link, for example. Similarly, other portions of methods 300 and 400, such as such as rendering an advertisement on mobile device 102, illustrated at blocks 308 and 408, may be performed multiple times for each time that advertisement information is received.

Those skilled in the art will appreciate that the example methods described above in reference to FIGS. 3 and 4, alone or in combination, will allow mobile device 102 to identify a first advertisement and display that advertisement on mobile device 102. The advertisement may be identified before the advertisement is to be displayed, thereby allowing mobile device 102 to retrieve the advertisement if necessary before display is required. In this way, burdens placed on broadcast system 100 can be minimized and mobile device 102 may identify and display advertisements specific to mobile device 102 or a user of mobile device 102. Thus, those skilled in the art will appreciate that the example methods described above in reference to FIGS. 3 and 4, alone or in combination, will increase a likelihood of advertisement display on mobile device 102.

Figure 5:
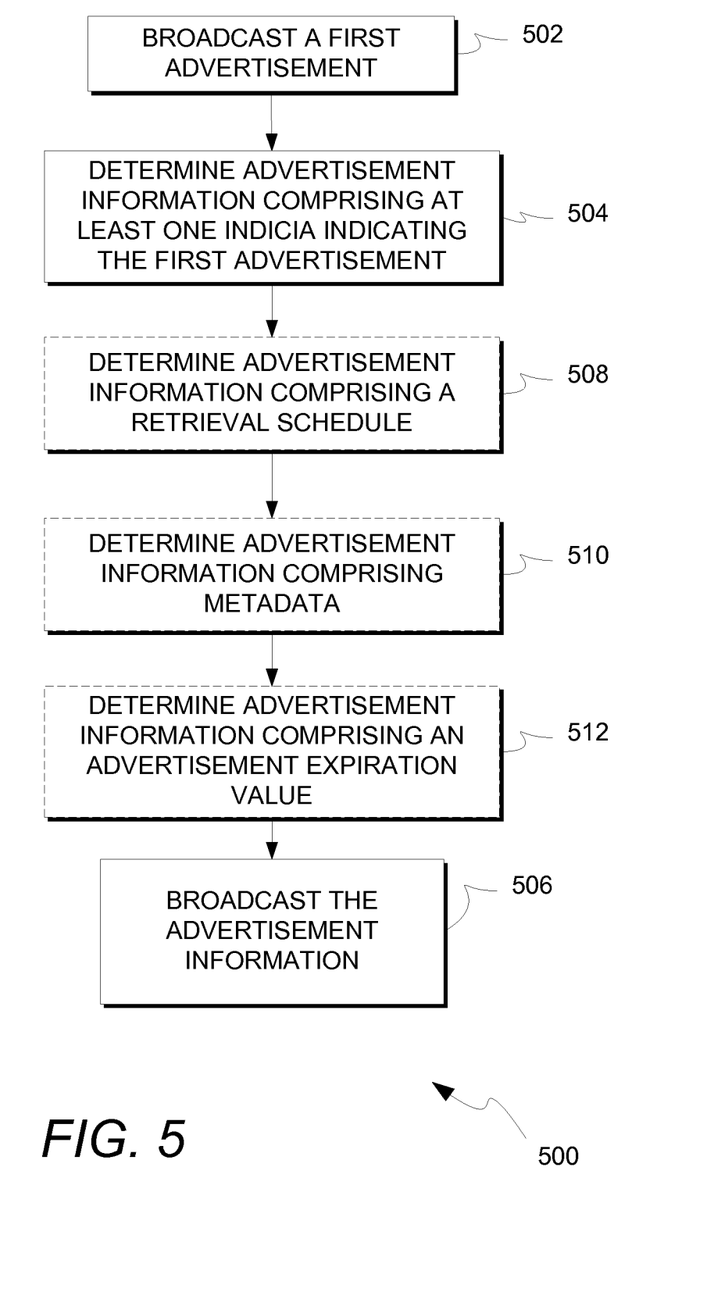
FIG. 5 is a flowchart illustrating an example of a method of allowing a broadcast system, such as illustrated in FIG. 1, to broadcast advertisement information.

FIG. 5 is a flowchart illustrating an example of a method of allowing a broadcast system 100, such as illustrated in FIG. 1, to broadcast advertisement information. The acts or events associated with method 400 may be performed by different configurations of mobile device 102 than those herein described. Those skilled in the art will know how to extend the method described to different configurations of mobile device 102 and will understand that different components within mobile device 102 may perform the method than are herein described.

At block 502, a first advertisement is broadcast. The advertisement is broadcast over a communications link in broadcast system 100, such over the content communication link 108 or the second communication link 106. The broadcast is performed by a broadcast device, such as a device used in implementation of the distribution system 110 of FIG. 1. The distribution system 110 may be a single distribution system or may include multiple local distributions systems. The advertisement may be provided to distribution system 110 by content provider 112 and the advertisement may be a multimedia item.

At block 504, advertisement information comprising at least one indicia indicating the first advertisement is determined. The indicia may indicate the first advertisement as described in reference to block 302 of method 300. The indicia may be determined by different devices or modules within broadcast system 100. For example, distribution system 110 may determine the advertisement information according to a geographic area in which the distribution system is located in. Content guide service 126 may determine the advertisement information according to identified content items. Content provider 112 may determine the advertisement information according to sponsors of the content.

At optional block 508, advertisement information comprising a retrieval schedule is determined. The retrieval schedule may be as described with reference to block 402 of method 400. The retrieval schedule may be determined by different devices or modules within broadcast system 100. For example, distribution system 100 may determine the retrieval schedule according to when it will be available to broadcast an advertisement. Content guide service 126 may determine the retrieval schedule according to when mobile device 102 will be available to switch operating modes and retrieve an advertisement. Content provider 112 may determine the retrieval schedule according to when advertisements will be available.

Advertisement information comprising a presentation schedule may also be determined at optional block 508. The presentation schedule may be a schedule that identifies the time or order in which broadcast content is to be displayed on mobile device 102, as described with reference to block 302 of method 300. The presentation schedule may be determined by different devices or modules within broadcast system 100. For example, distribution system 100 may determine the presentation schedule according to when content items will be distributed to mobile device 102. Content guide service 126 may determine the presentation schedule according to a length of a program or of the first advertisement. Content provider 112 may determine the presentation schedule according to availability of content.

At optional block 510, advertisement information comprising metadata may be determined. The metadata may contain information relating to a priority of the first advertisement, a priority of one or more attributes of the advertisement, or a demographic applicability of the advertisement, among other information, as described with reference to block 302 of method 300. The metadata may be determined by different devices or modules within broadcast system 100. For example, distribution system 110 may determine the metadata according to a geographic area in which it broadcasts. Content guide service 126 may determine the metadata according to preferred lengths or attributes. Content provider 112 may determine the metadata according to a prioritized list of companies sponsoring advertisements.

At optional block 512, advertisement information comprising an advertisement expiration value may be determined. The advertisement expiration value may identify when the first advertisement expires or when the advertisement should no longer be displayed, as described with reference to block 302 of method 300. The advertisement expiration value may be determined by different devices or modules within broadcast system 100. For example, distribution system 110 may determine the advertisement expiration value according to how often it broadcasts new advertisements. Content guide service 126 may determine the advertisement expiration value according to the number of different programs currently available. Content provider 112 may determine the advertisement information according to when new advertisements may become available.

Those of skill in the art will recognize that the determination of advertisement information can be accomplished using methods in addition to those described herein. The above examples and descriptions are merely illustrative. Blocks 504, 508, 510, and 512 may be performed in any order within the scope of this disclosure. There may also be a greater number of determination blocks or steps, or less than the number illustrated. In addition, devices or modules other than those illustrated may determine the advertisement information, as will be recognized by those skilled in the art from the above disclosure of devices, modules, functions, and advertisement information. Also, the illustrated devices and modules may determine advertisement information in ways other than described above and may determine different advertisement information than described. Such deviations from the above descriptions are within the scope of this disclosure.

At block 506, the advertisement information is broadcast. The advertisement information is broadcast over a communications link in broadcast system 100, such over content communication link 108 or second communication link 106. The broadcast is performed by a broadcast device, such as a device used in implementation of the distribution system 110 of FIG. 1. The distribution system 110 may be a single distribution system or may include multiple local distributions systems. The advertisement information may have been generated at or in the broadcasting device or distribution system 110, received from another device or module, or a combination of the two.

After broadcasting the advertisement information, an indicator of when the first advertisement should be rendered may be determined and broadcast. The indicator may be as described with reference to block 310 of method 300. The indicator may be determined by different devices or modules within broadcast system 100. For example, distribution system 110 may determine the indicator according to when system traffic makes it hard to broadcast content. Content guide service 126 may determine the indicator according to the length of programming or according to an appropriate place in the content at which to break. Content provider 112 may determine the indicator 112 according to how often a sponsoring company has been promised display of advertising material.

The indicator may be broadcast over a communications link in broadcast system 100, such as over content communication link 108 or second communication link 106. The broadcast may be performed by a broadcast device, such as a device used in implementation of the distribution system 110 of FIG. 1, which may be a single distribution system or may include multiple local distributions systems.

Determination and broadcast of an indicator allows broadcast system 100 to determine when to display advertisements as needed. The specific time or location at which to display an advertisement does not need to be specified well beforehand; specification can be delayed until closer to or immediately before display. In this way, the burdens placed on broadcast system 100 at the beginning of a broadcast can be minimized and such burdens can be distributed throughout the broadcast. In this way, changing conditions can also be considered. To ad to this, broadcast system 100 can indicate that an advertisement is to be displayed in response to instructions received from outside the system, such as from a sponsoring company.

A request for an advertisement may also be received, such as from mobile device 102, and the advertisement transmitted for reception by the requesting device. In one embodiment, the advertisement may be broadcast, such as by a broadcast device used in implementation of the distribution system 110 of FIG. 1. In another embodiment, the advertisement may be transmitted over a direct connection with the requesting device, such as by content provider 112. In this embodiment, a specific advertisement or an advertisement with specific attributes can be provided to the requesting device without requiring broadcast of the advertisement. In this way, advertisements targeted to the requesting device or a user of the requesting device can be provided.

Those skilled in the art will appreciate that the advertisement information may be much smaller in size than an advertisement. Thus, the advertisement information may be broadcast more often than an advertisement without unduly occupying system resources. In addition, the advertisement information may be broadcast before the broadcast of any content, thereby enabling mobile device 102 to retrieve any required advertisements, possibly over a different connection than the broadcast connection. To add to this, the advertisement information may be used to control a library of advertisements on mobile device 102, such as by a combination of indicia, metadata, and advertisement expiration values. For example, the advertisement information may contain indicia indicating one or more advertisements intended for display on mobile device 102 at a predetermined time and/or date. Mobile device 102 may determine whether the advertisements are located on mobile device 102 and accordingly ensure that they are retrieved and stored by the predetermined time and/or date.

Those skilled in the art will appreciate that the apparatuses and methods of the disclosure may be used to provide targeted advertising by ensuring that a first advertisement is located on mobile device 102. Specifically, the system of the disclosure minimizes the challenges related to guaranteeing advertisement display on mobile device 102 where uncertainty may exist as to whether the first advertisement is located on mobile device 102. Accordingly, instead of occupying network capacity for delivering ads at the time of display over the broadcast network, the system of the disclosure allows for identifying required ads beforehand and retrieving the ads in time to render them for display on mobile device 102. Thus, an increase in a likelihood of advertisement display can be attained.

Any illustrative logical blocks, modules, and circuits described in connection with the embodiments disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those skilled in the art will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the scope of this disclosure. As will be recognized, the invention may be embodied within a form that does not provide all of the features and benefits set forth herein, as some features may be used or practiced separately from others. The scope of this disclosure is defined by the appended claims, the foregoing description, or both. All changes which come within the meaning and range of equivalency of the claims are to be embraced within their scope.

What is claimed is:

1. A method for increasing a likelihood of presenting a first content item on a display of a mobile device, comprising:
   receiving into a storage module of the mobile device over a first broadcast communication link a content item information and a retrieval schedule, wherein the content item information comprises at least one indicia indicating a first content item and an expiration value of the first content item;
   determining, based upon the content item information and irrespective of the retrieval schedule, whether the first content item is located in the storage module of the mobile device;
   determining whether the expiration value of the first content item has lapsed in response to determining that the first content item is located in the storage module of the mobile device; and
   retrieving an updated version of the first content item from a remote device at a time determinable from the retrieval schedule in response to determining that the expiration value of the first content item has lapsed.

2. The method of claim 1, wherein the retrieving is by reference to a time listed in the retrieval schedule.

3. The method of claim 1, wherein the retrieving is by connecting to the remote device over a unicast network connection.

4. The method of claim 1, further comprising:
   monitoring for a transmission of the first content item identified by the content item information in response to said determining; and
   storing the first content item in the storage module of the mobile device.

5. The method of claim 1, wherein the content item information further comprises a demographic applicability of the first content item, the method further comprising:
   determining whether the demographic applicability of the first content item corresponds to a user profile of a user of the mobile device,
   wherein determining, based upon the content item information and irrespective of the retrieval schedule, whether the first content item is located in the storage module of the mobile device comprises determining, based upon the content item information and irrespective of the retrieval schedule whether the first content item is located in the storage module of the mobile device in response to determining the demographic applicability of the first content item corresponds to the user profile of the user of the mobile device.

6. The method of claim 1, wherein the content item information further comprises metadata representing a priority of the first content item, a priority of one or more attributes of the first content item, or a demographic applicability of the first content item.

7. A method of increasing a likelihood of presenting a first content item on a mobile device display, comprising:
- receiving a presentation schedule, a retrieval schedule, and a content item information comprising indicia indicating the first content item and an expiration value of the first content item;
- determining, based upon the content item information and irrespective of the presentation schedule and the retrieval schedule, whether the first content item is located in a storage module of the mobile device;
- determining whether the expiration value of the first content item has lapsed in response to determining that the first content item is located in the storage module of the mobile device;
- retrieving an updated version of the first content item from a remote device at a time determinable from the retrieval schedule and storing the updated version of the first content item on the storage module on the mobile device in response to determining that the expiration value of the first content item has lapsed; and
- rendering the updated version of the first content item on the mobile device in accordance with the presentation schedule.

8. The method of claim 7, further comprising:
- storing the presentation schedule on the mobile device; and
- updating the presentation schedule after rendering the updated version of the first content item on the mobile device.

9. The method of claim 7, further comprising receiving an indicator of when the first content item should be rendered within the presentation schedule and wherein rendering the updated version of the first content item is by reference to the indicator.

10. The method of claim 7, wherein the content item information further comprises a demographic applicability of the first content item, the method further comprising:
- determining whether the demographic applicability of the first content item corresponds to a user profile of a user of the mobile device,
- wherein determining, based upon the content item information and irrespective of the presentation schedule and the retrieval schedule, whether the first content item is located in the storage module of the mobile device comprises determining, based upon the content item information and irrespective of the presentation schedule and the retrieval schedule whether the first content item is located in the storage module of the mobile device in response to determining the demographic applicability of the first content item corresponds to the user profile of the user of the mobile device.

11. The method of claim 7, wherein the content item information further comprises metadata representing a priority of the first content item, a priority of one or more attributes of the first content item, or a demographic applicability of the first content item.

12. A mobile device for presenting a first content item, comprising:
- a receiver configured to receive a content item information, a retrieval schedule, and a presentation schedule, wherein the content item information comprises indicia indicating the first content item and an expiration value of the first content item;
- a storage module configured to store at least the first content item;
- a processor configured to perform operations comprising:
  - determining based upon the content item information and irrespective of the presentation schedule and the retrieval schedule, whether the first content item is located in the storage module;
  - determining whether the expiration value of the first content item has lapsed in response to determining that the first content item is located in the storage module of the mobile device; and
  - retrieving an updated version of the first content item from a remote device at a time determinable from the retrieval schedule and storing the updated version of the first content item in the storage module in response to determining that the expiration value of the first content item has lapsed; and
- a rendering module configured to render the updated version of the first content item on a display of the mobile device at a time determinable from the presentation schedule.

13. The mobile device of claim 12, wherein the processor is configured to perform operations further comprising retrieving the updated version of the first content item from the remote device by reference to the retrieval schedule by modifying operation of the mobile device to connect to the remote device over a unicast network connection.

14. The mobile device of claim 12, wherein the processor is configured to perform operations further comprising storing the presentation schedule in the storage module; and
- updating the presentation schedule after the rendering module renders the updated version of the first content item.

15. The mobile device of claim 12, wherein the receiver is further configured to receive the first content item via a broadcast stream, and wherein the processor is configured to perform operations further comprising:
- determining that the received first content item is identified by the content item information; and
- storing the received first content item in the storage module.

16. The mobile device of claim 12, wherein the rendering module is further configured to render the updated version of the first content item by reference to a received indicator of when the first content item should be rendered.

17. The mobile device of claim 12, wherein the content item information further comprises a demographic applicability of the first content item,
- wherein the processor is configured to perform operations further comprising determining whether the demographic applicability of the first content item corresponds to a user profile of a user of the mobile device, and
- wherein the processor is configured to perform operations such that determining, based upon the content item information and irrespective of the presentation schedule and the retrieval schedule, whether the first content item is located in the storage module comprises determining, based upon the content item information and irrespective of the presentation schedule and the retrieval schedule whether the first content item is located in the storage module of the mobile device in response to determining the demographic applicability of the first content item corresponds to the user profile of the user of the mobile device.

18. The mobile device of claim 12, wherein the content item information further comprises metadata representing a priority of the first content item, a priority of one or more attributes of the first content item, or a demographic applicability of the first content item.

19. A non-transitory processor readable medium, having stored thereon processor-executable instructions configured to cause a mobile device processor to perform operations comprising:

receiving a content item information, a retrieval schedule, and a presentation schedule, wherein the content item information comprises indicia indicating the first content item and an expiration value of the first content item;

determining based upon the content item information and irrespective of the presentation schedule and the retrieval schedule, whether the first content item is located in a storage module of a mobile device;

determining whether the expiration value of the first content item has lapsed in response to determining that the first content item is located in the storage module of the mobile device;

retrieving an updated version of the first content item from a remote device at a time determinable from the retrieval schedule and storing the updated version of the first content item on the storage module on the mobile device in response to determining that the expiration value of the first content item has lapsed; and rendering the updated version of the first content item on the mobile device in accordance with the presentation schedule.

20. A mobile device for presenting a first content item, comprising:

a receiver configured to receive into a storage module of the mobile device over a first broadcast communication link a content item information and a retrieval schedule, wherein the content item information comprises at least one indicia indicating a first content item and an expiration value of the first content item;

a processor configured to perform operations comprising:

determining, based upon the content item information and irrespective of the retrieval schedule, whether the first content item is located in the storage module of the mobile device;

determining whether the expiration value of the first content item has lapsed in response to determining that the first content item is located in the storage module of the mobile device; and retrieving an updated version of the first content item from a remote device at a time determinable from the retrieval schedule in response to determining that the expiration value of the first content item has lapsed.

21. A non-transitory processor readable medium, having stored thereon processor-executable instructions configured to cause a mobile device processor to perform operations comprising:

receiving into a storage module of a mobile device over a first broadcast communication link a content item information and a retrieval schedule, wherein the content item information comprises at least one indicia indicating a first content item and an expiration value of the first content item;

determining, based upon the content item information and irrespective of the retrieval schedule, whether the first content item is located in the storage module of the mobile device;

determining whether the expiration value of the first content item has lapsed in response to determining the first content item is located in the storage module of the mobile device; and retrieving an updated version of the first content item from a remote device at a time determinable from the retrieval schedule in response to determining that the expiration value of the first content item has lapsed.

* * * * *